United States Patent [19]

Henry et al.

[11] Patent Number: 4,460,921
[45] Date of Patent: Jul. 17, 1984

[54] PROCESS FOR MONITORING CRIMPED MATERIAL

[75] Inventors: James W. Henry; Thomas A. Mitchell, both of Kingsport, Tenn.

[73] Assignee: Eastman Kodak Company, Rochester, N.Y.

[21] Appl. No.: 437,061

[22] Filed: Oct. 27, 1982

[51] Int. Cl.³ ............................................. H04N 7/18
[52] U.S. Cl. .................................. 358/107; 358/101; 358/106; 356/431
[58] Field of Search ................. 358/93, 101, 106, 107, 358/903; 356/431

[56] References Cited

U.S. PATENT DOCUMENTS

| | | | |
|---|---|---|---|
| 4,232,336 | 11/1980 | Henry | 358/107 |
| 4,240,110 | 12/1980 | Henry | 358/107 |
| 4,274,746 | 6/1981 | Cardell | 356/431 |
| 4,319,272 | 3/1982 | Henry | 358/107 |

*Primary Examiner*—Howard W. Britton
*Attorney, Agent, or Firm*—John F. Stevens; D. B. Reece, III

[57] ABSTRACT

Disclosed is a method of monitoring planar sections of material having generally parallel crimps, the material having a longitudinal dimension extending generally perpendicular to the crimps and a transverse dimension generally parallel to the crimps. The material, such as a bundle of crimped fibers or tow, generally defines a plane, and the method comprises
 (a) illuminating the material along a line generally longitudinally of the material and over a plurality of the crimps by causing a plane of light, or the plane defined by sweeping a ray of light, to intersect with the surface of the material at an angle of between about 30° and about 60° with the plane of the tow when viewed along the tow band, such that the light intersecting the crimped material produces a generally zig-zagged line of illumination when viewed from an angle other than that of the light source, the peaks and valleys of which illustrate the profile of the crimped material, and
 (b) recording the pattern of the generally zig-zagged line from an angle relative to the material different from the plane of light such that the profile of the material can be determined.

8 Claims, 4 Drawing Figures

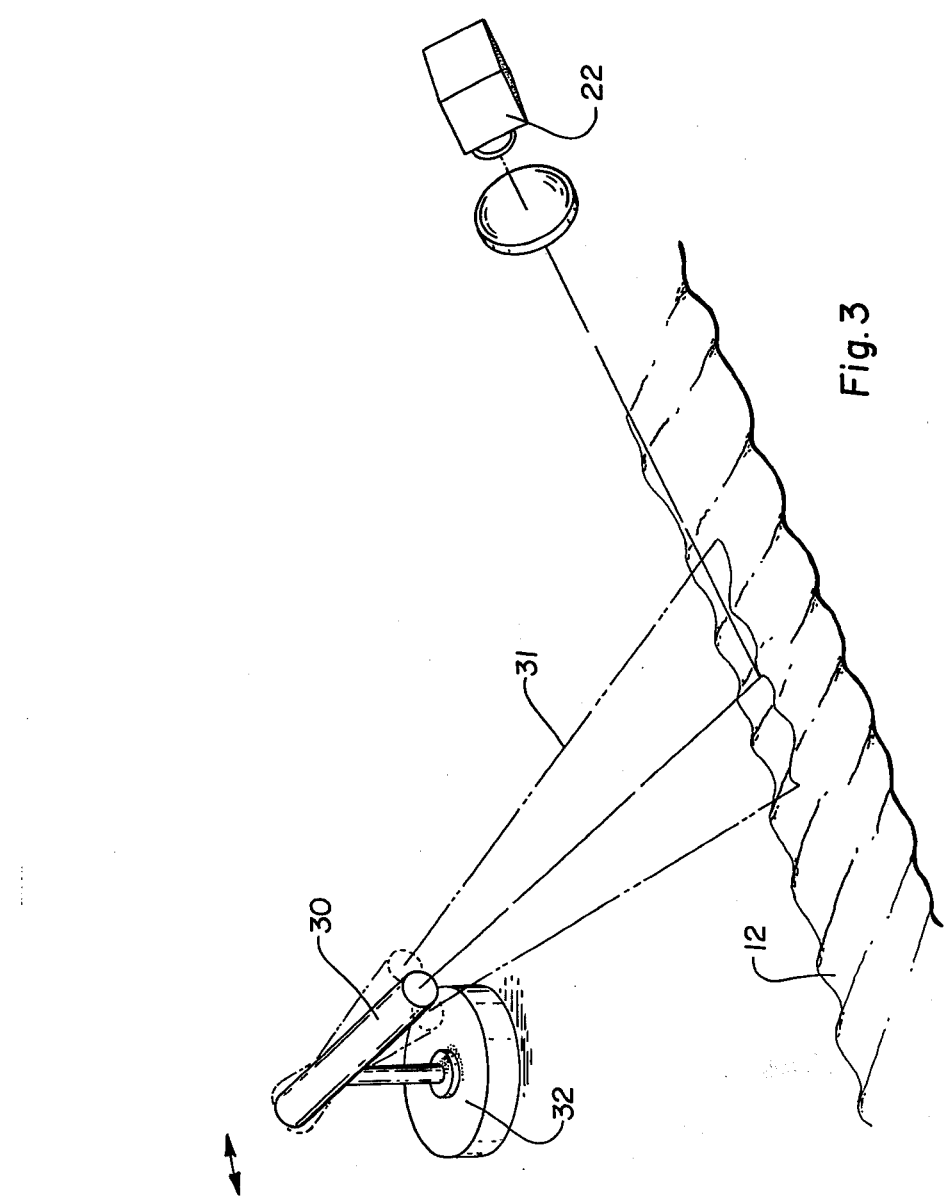

PROCESS FOR MONITORING CRIMPED MATERIAL

DESCRIPTION

1. Technical Field

This invention relates to a process for monitoring crimped material such as a crimped fiber bundle or fiber tow.

2. Background of the Invention

Synthetic fiber is manufactured in continuous lengths using a process for extrusion in which a polymeric material suitable for melting is extruded through small diameter holes in an extrusion nozzle or spinneret. Polymers not readily adapted for melting are extruded from a viscous solution in which, during the extrusion process, the solvent is removed from the filaments either by evaporation or by differential solubility of the solvent in a surrounding liquid medium. The filaments produced by these processes are characterized by their linear geometry and essentially smooth surfaces. In some instances, filaments are produced with geometry such as "Y" shape, "X" shape, star shape, semicircular shape, rectangular shape, but in general such fibers will be made with a solid cylindrical shape.

Such essentially linear fibers are not well adapted to incorporation into the usual textile manufacturing process. Usually, synthetic fibers will be blended with either natural or other synthetic fibers. The blending process involves mechanically mixing the fibers using special apparatus designed to carry out such operations. The usual linear geometry of the synthetic fiber does not permit satisfactory blending of the fibers, since the synthetic fibers tend to fall out of the mixture. To overcome this tendency, the linear synthetic fiber is crimped so that its shape approximates that of a natural fiber. The crimped shape of the synthetic fiber makes it possible to mechanically mix different fibers and have the fiber mix hold together.

In other special cases, crimping of the synthetic fiber is done to impart geometry to the fiber which will fit it for a role such as a filter medium where the amount of fiber incorporated into the filter has a direct effect on the efficiency of the filter.

Whether crimping is carried out to effect superior mechanical mixing of different fiber types, or it is carried out to fit the fiber to a role of providing a high surface for such tasks as filtering, the nature of the crimp imparted to the fiber becomes a matter of concern. In general, this shape can be determined by placing the fiber on a plane surface with minimum force applied to change its geometry. Observation of the line shown by the fiber profile against the plane surface will show the geometry of the crimped shape imparted to the fiber in the crimping process. This shape when analyzed either mechanically or electrically produces a plot of displacement versus fiber unextended length analogous to a waveform. The shape of the crimp will sometimes be referred to herein as "crimp profile".

Plotting of the crimp profile has been done by extracting single filaments from the bundle of crimped fibers usually prepared in the crimping operation and placing the filament against a plane surface having sufficient optical contrast with the color of the filament to permit visual determination of the coordinates of the points along the waveform. In some instances, photography is enlisted to record the profile on a background of rectangular coordinate graph paper. Because of the small size of the filament, microscopy is frequently used to view the fiber against its background, and a photographic record is frequently made using microscropic projection of the filament to the photographic film. The arrival of the computerized video viewed microscopy system has permitted extraction of the profile coordinates using the computer. Further processing of the profile is frequently possible with the computer to the extent that the profile can be compared with idealized waveforms, or the Fourier analysis of the profile can be made in which various harmonic components of the waveform can be determined.

The mechanical technique of extracting a single filament from the bundle exposes the true profile existing in the fiber bundle to distortion since in removing the fiber mechanical changes will be made in the unextended length of the fiber and forces may be applied which will alter the waveform shape. Further, the technique is labor intensive and requires extensive skill on the part of the operator if errors are not to be introduced in the measurement. If statistical studies are to be made, the labor required to provide an acceptable sample may become excessively high. The extraction technique is of necessity destructive in nature, since a section of fiber must be removed from the continuous filament. For this reason, the extraction technique is not well suited for applications where essentially continuous monitoring of the waveform is necessary.

My U.S. Pat. Nos. 4,232,336 and 4,240,10 disclose subject matter which is of interest.

BRIEF DESCRIPTION OF THE DRAWINGS

FIG. 3 is a perspective view similar to FIG. 1 illustrating another embodiment of the process of the present invention.

DESCRIPTION OF INVENTION

According to the present invention, there is provided a method of monitoring planar sections of material having generally parallel crimps, the material having a longitudinal dimension extending generally perpendicular to the crimps and a transverse dimension generally parallel to the crimps. The material, such as a bundle of crimped fibers or tow, generally defines a plane, and the method comprises (a) illuminating the material along a line generally longitudinally of the material and over a plurality of the crimps by causing a plane of light, or the plane defined by sweeping a ray of light, to intersect with the surface of the material at an angle of between about 30° and about 60° with the plane of the material when viewed along the longitudinal dimension, such that the light intersecting the crimped material produces a generally zig-zagged line of illumination, when viewed from an angle other than that of the light source, the peaks and valleys of which illustrate the profile of the crimped material, and (b) recording the pattern of the generally zig-zagged line from an angle relative to the material different from the plane of light such that the profile of the material can be determined.

Figure 1:
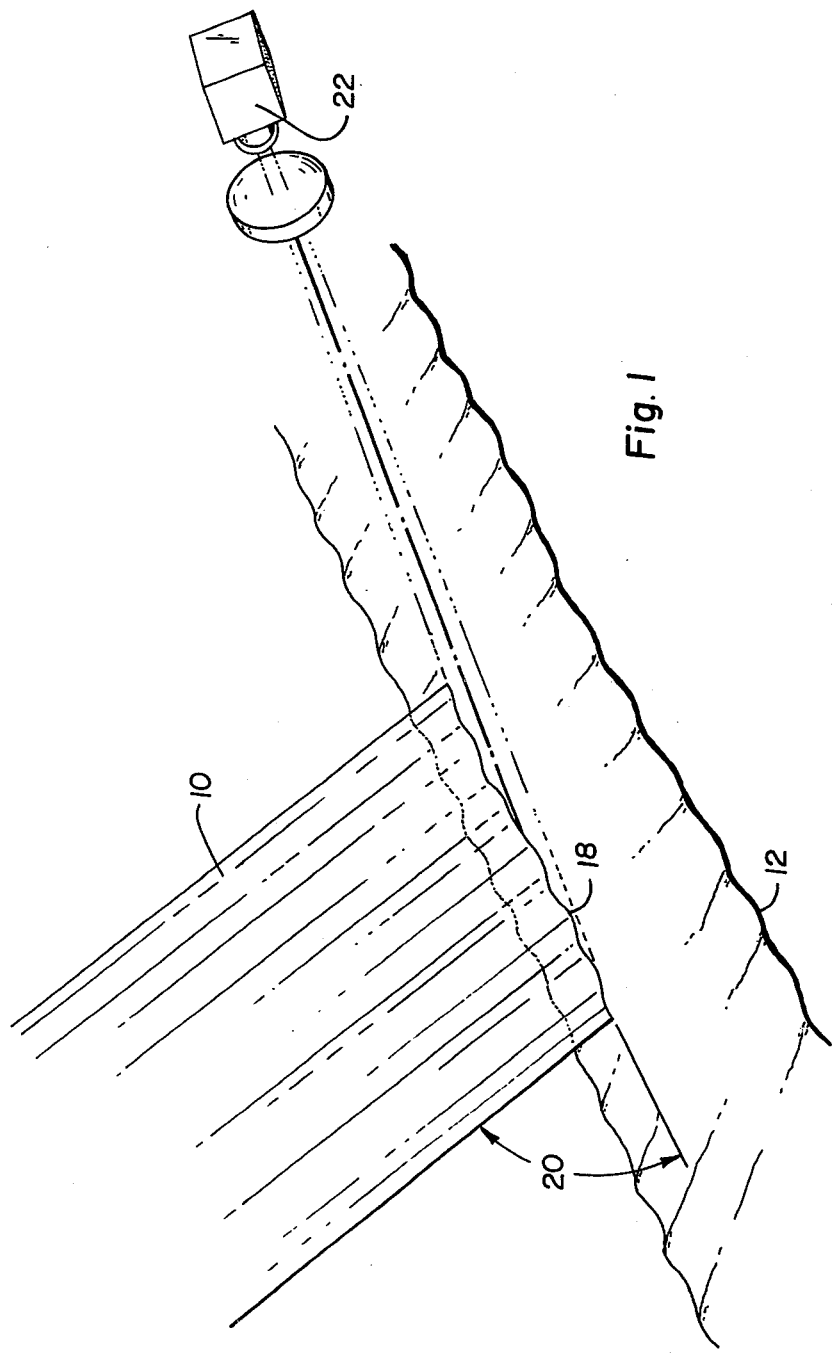
FIG. 1 is a perspective view in diagrammatic form illustrating the process of the present invention.
Figure 2:
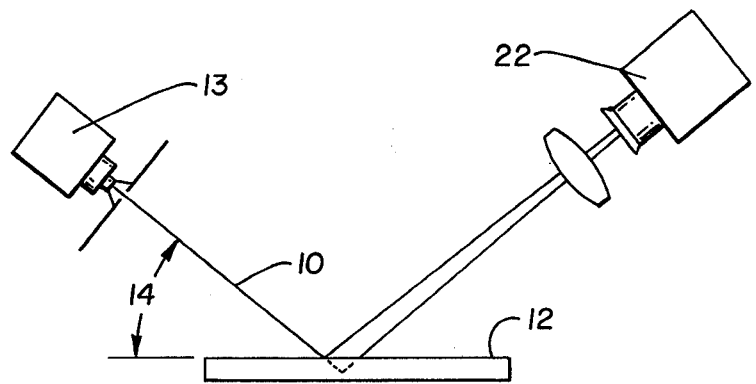
FIG. 2 is an elevation view in diagrammatic form illustrating the process of the present invention.

Referring to the drawings, in FIGS. 1 and 2, there is illustrated a planar beam of light 10 directed at the surface of crimped tow 12 by light source 13. Angle 14 is the angle between the plane of the tow and the plane of light beam 10. Angle 14 is suitably chosen between about 30° and about 60° such that the zig-zagged line of illumination 18 distinctly represents the peaks and valleys of the crimped tow. The angle 20 of the beam of light 10 with respect to the lengthwise orientation of the fibers in tow 12 is most suitably about 90°. The intersection of light beam 10 with the crimped tow 12 is a representation of the profile of the crimped tow as represented by zig-zagged line 18.

Means for detecting the zig-zagged line 18 are positioned opposite the light source 13. As illustrated in the drawings, this means of detection may be a video camera 22 which continuously records the profile of the crimped tow 12 as it is advanced. Tow 12 may be continuously advanced through the inspection station by one or more pairs of drive rolls (not shown) as is well known to those skilled in the art. Alternately, a stationary section of tow may be positioned for inspection if desired. For monitoring a moving tow bundle, it may be desirable to use a strobe light, suitably synchronized with the detecting means, to "stop" the motion of the tow bundle. Such equipment and the use thereof are, of course, well known to those skilled in the art.

This process for making visible the profile of a crimped fiber bundle takes advantage of the geometry of the fiber bundle as it enters and leaves the crimping process. The fibers are arrayed in a plane web arrangement from the crimper as a crimped web. Subsequent withdrawal of the crimped web from the crimping machine extends the fiber somewhat but leaves the essential crimped pattern imparted by the crimper. The fiber readied for subsequent processing lies in an essentially planar state with the crimped undulations rising above and falling below the plane formed by the zero point of deviation of the crimp profile within the web.

The sheet of light 10 obviously has thickness of some magnitude. To be more accurate in showing the crimp profile, the interface at one of the lengthwise edges of the sheet of light may be used as a representation of the crimp profile. Thus, any error which might occur due to the thickness of the sheet of light is eliminated. In this embodiment of the invention, it may be desirable to use a thicker sheet of light than would be used otherwise. Thus, the image formed by the occultation of a portion of a lighted area may be focussed upon the surface of the crimped fiber so that an illuminated area which is sharply defined along lines separating it from the occulted area or areas is formed. The illuminated area records, but the non-illuminated or occulted area does not record on either photographic film or video equipment. The interface between the illuminated and non-illuminated areas is thus used as a representation of the crimp profile. As an example, a photographic slide may be prepared having a transparent area and one or more opaque areas separated by a straight, sharply defined interface. The projection of this slide onto a crimped fiber band, with the interface extending generally lengthwise of the band produces a representation of the profile of the crimped fiber band. Thus, a line of demarcation between light and dark (for example, one of the interfaces at an edge of a sheet of light described herein) is used as a representation of the crimp profile.

It is possible to show the crimp profile by illuminating the fiber bundle with either a sheet of light 10 (FIG. 1) or a scanned ray of light 31 (FIG. 3) so arranged that the scanned ray movement runs colinear with the fiber direction in the web. When the ambient illumination on the plane of the fiber web is low with respect to the illumination due to the line of light formed by the intersection of the light plane with the fiber plane, the light reflected due to the intersection shows the relative elevation of the fiber plane above and below the plane described by the zero point of deviation of the crimp waveform of the fiber bundle. An appropriate angle for the intersection of the fiber bundle plane and the plane of light formed by the illuminaing rays is about 30°–60°, preferably about 45°. With this angle, it is possible to show a crimp profile as an illuminated trace along the visible surfaces of the fiber bundle. Viewing from directly over the fiber bundle shows the true projection of the profile. Thus, the viewing or recording position is at an angle of between about 45° and 120°, preferably about 90°, with respect to the plane of light. Viewing from an oblique angle (for example, 45°) produces an enhanced amplitude profile. The greatest enhancement of amplitude is produced when the included angle between the illuminating plane and viewing direction is 90°.

The illuminated trace showing the profile may be detected and monitored using conventional photographic techniques, video recording techniques, or optical scanning techniques. Of these, those using video and optical scanning with photoelectric sensing provide the most immediate and convenient access to further processing and analysis of the profile utilizing a digital computer.

As best shown in FIG. 3, satisfactory profile traces of the crimp waveform can be produced by mounting a helium-neon laser source 30 of about one milliwatt power output so that the laser beam 31 is pivoted on a trunnion 32 such that the laser can be swiveled in an arc to produce an essentially straight line parallel to the fiber direction in the bundle. The laser is mounted so that its emerging rays intersect the plane of the fiber bundle at an angle of about 30°–60°, preferably about 45°. The fiber bundle 12 is stretched to a predetermined tension (e.g., the tension imparted by suspending a 100-gram weight from the tow appears to be satisfactory) and is mounted while stretched on a metal board where the ends of the tow are fixed in position. A photographic camera 33 equipped with a large aperture lens is mounted and angled at 45° to the plane of the fiber bundle 12 and positioned to photograph the area of fiber bundle illuminated by the laser ray sweep. The shutter of the camera is opened and remains open while the laser sweeps the fiber bundle. The rate of sweeping is regulated to permit the production of the sharpest and best photographic negative density record of its passage over the fiber bundle. The sweeping of the laser ray bundle approximates the generation of a plane of light intersecting the plane of the fiber bundle. The line of intersection of the light plane and the fiber bundle plane is defined as a reflected light line which describes the waveform undulation of the fibers making up the fiber bundle plane. Using a high contrast, low granularity photographic film, it is possible to record this line. Through the examination and analysis of this ray trace record superimposed on a low density photograph of the fiber bundle plane, we have successfully been able to determine differences between two fiber bundles performing differently but supposedly originating from similar manufacturing conditions. These differences in profile have led to postulation of theories relating to means for improving the performance of the fibers.

By replacing the photographic camera with a video camera, video pictures of the fiber bundle with the profile trace superimposed can be produced. Resort to a matrix type video camera, in which the photo sensing element is a matrix of about 250,000 photosensitive diodes arranged in a rectangular array, produces results leading to the introduction of the video signal to a digital computer for subsequent mathematical manipulation of the crimp profile information. Similar results of a lower degree of contrast and precision are obtained using a video camera utilizing an electronic camera tube such as the Vidicon camera.

In using the video camera as the viewer of the waveform scan, the rate of image frame production exceeds the capability of the usual digital computer to accept picture information. Colorado Video Type 274C "frame grabber" video picture storage unit consists of an analog to digital convertor, an 8-bit byte random access memory, and a digital to analog convertor. It is possible to interface the memory to a 16-bit digital computer so that direct transfer of the video image stored in the random access memory can be effected to the memory of the computer. Sufficient storage capacity is available in the "frame grabber" to permit the retention of a single frame of 512 by 512 lines resolution video picture. Means are available to permit accumulation of a single frame immediately after the device is gated to the "on" condition. Storage continues until the entire frame is accumulated and then ceases. Erasure of the memory readies it for acceptance of a new frame.

Figure 4:
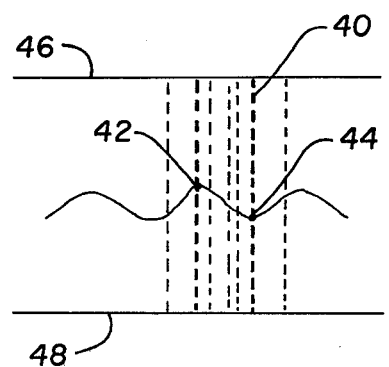
FIG. 4 is a graphical representation of a video screen and a method of obtaining crimp measurements.

Because the video frame can be retained for a long period of time, it is possible for the digital computer of modest speed to fully extract and process any picture information contained in a single frame. Extraction of an electrical waveform from the pictorially displayed video waveform is one of the computer tasks made easier through the use of the "frame grabber", as illustrated in FIG. 4. In carrying out the process for extraction of the waveform, the video camera is turned 90° from its usual orientation. This means that the scanning lines 40 run vertically instead of the normal horizontal configuration. The points of light 42 and 44 defining the intersection of the light plane with the fiber plane when they fall on the video camera sensing target act as points in a Cartesian graphic array. Since each scanning line starts at the edge of the picture frame 46 (zero position) and scans to the opposite side 48, the distance traversed by the scanning process in laying out each scanning line serves as a measure of the distance between the edge 46 and the point of light 42 or 44. By measuring the placement of each point from the zero position and treating the scanning line as an ordinate in the graphic array, it is possible to define the position of each point on the crimp waveform versus ordinate position. The ordinate positions are equally spaced. Scanning the memory array at an equal period between interrogation of each ordinate point stored produces a time sequence of ordinate positions which describes the crimp profile or waveform as an electrical waveform. Measurement by time lapse along a scan line 40 from zero position 46 to point 42 or 44 is conventional practice well known to those skilled in the art. See, for example, U.S. Pat. No. 4,319,272, incorporated herein by reference. Of particular interest is the specification beginning at Col. 3, line 36. Such a waveform fits easily into software designed to determine such factors as harmonic waveform content of the complex wave, statistical distribution of both amplitude and time of occurrence within the complex waveform, and correspondence between an idealized waveform and the experimentally obtained waveform. Other methods of digital image enhancement and analysis may be used.

Instead of the light plane technique, the scanned laser ray technique may be employed as shown in FIG. 3. The reflected image of intersection of the plane formed by the laser sweeping ray and the fiber bundle plane may be focused by suitable optics on an optical neutral density filter system which is graded in a continuous gray scale from top to bottom with the gradation continuing at a given density across the width of the filter. Such a device forms an optical neutral density wedge. Since the reflected locus point from the fiber bundle plane moves up and down in the lens transmitted image, the point moves vertically along the neutral density wedge being transmitted to the photo sensor in modulation according to the position of the light image spot on the wedge. The light spot is thus modulated according to its position. The result of this approach is to produce a modulated electrical output versus sweep time for the laser ray sweep which provides an electrical waveform suitable for digital or analog analysis for harmonic content or statistical waveform distribution.

A digital approach to reading the height of the waveform above an established zero position utilizes the charge-coupled linear array of photodetectors. One such device is made by the Reticon Corporation of Sunnyvale, Calif. In our use of the linear photocell array, we have found the laser ray sweep method of scanning the fiber bundle plane most effective. The spot of light moves vertically as it scans horizontally across the fiber array. The reflected light spot describing the locus of intersection between the plane of light described by the sweep of the laser ray and the plane of the fiber bundle is focused upon the linear photocell array so that the vertical movement of the spot traverses the length of the array. As the spot is caused to move across the array, it illuminates discrete photocells to activate them to conduct. By appropriate interrelation of the laser ray scan rate and the scanning rate of the linear array cells, it is possible to produce an effect similar to the faster scan of the conventional video system. Each scan line showing the position of the crimp wave or profile in amplitude above the zero level will produce a digital output showing the height of the ordinate for the point on the waveform which fits into the scan. This series of ordinates can be entered into the digital computer memory for later analysis. Using digital to analog conversion, it is possible to reproduce the recorded information in electrical form for display in an oscilloscope. In general, we have found that a more effective display may be generated by plotting each point in Cartesian coordinates directly on the computer monitor screen. Again, harmonic content of the periodic wave, as well as statistical elements of the aperiodic wave, can be extracted from the recorded wave information.

The invention has been described in detail with particular reference to preferred embodiments thereof, but it will be understood that variations and modifications can be effected within the spirit and scope of the invention.

We claim:

1. A method of monitoring a planar section of material having generally parallel crimps, said material having a longitudinal dimension extending generally perpendicular to the crimps and a transverse dimension generally parallel to the crimps, said material generally defining a plane, comprising the steps of
    (a) illuminating said material along a line generally longitudinally of said material over a plurality of said crimps by causing a plane of light, or the plane defined by sweeping a ray of light, to intersect with the surface of said material at an angle of about 30° to about 60° with the plane of the material when viewed along the longitudinal dimension, such that the light intersecting the crimped material produces a generally zig-zagged line of illumination when viewed from an angle other than that of the light source, the peaks and valleys of which illustrate the profile of the crimped material, and
    (b) recording the pattern of the generally zig-zagged line from an angle relative to the material different from the plane of light such that the profile of the material can be determined.

2. A method according to claim 1 wherein the material is illuminated along said line by a plane of light.

3. A method according to claim 1 wherein the material is illuminated along said line by sweeping a ray of light along the surface of said material.

4. A method according to claim 1 wherein said material is a bundle of crimped fibers generally arranged in a flat plane.

5. A method according to claim 1 wherein the pattern of said line is recorded from an angle, relative to the angle of said plane of light, of between about 45° and about 120°.

6. A method according to claim 1 wherein a camera is used to record the pattern of generally zig-zagged lines.

7. A method according to claim 1 wherein selected points on the profile of said crimped material are measured relative to each other by determining the time lapse of scan lines of a video camera intersecting said points.

8. A method according to claim 1 wherein the generally zig-zagged line recorded is the interface between the illuminated and non-illuminated areas.

* * * * *